United States Patent [19]
Craft

[11] Patent Number: 5,557,551
[45] Date of Patent: Sep. 17, 1996

[54] METHOD AND APPARATUS FOR A THERMAL PROTECTION UNIT

[75] Inventor: David J. Craft, Austin, Tex.

[73] Assignee: International Business Machines Corporation, Armonk, N.Y.

[21] Appl. No.: 504,028

[22] Filed: Jul. 18, 1995

Related U.S. Application Data

[63] Continuation of Ser. No. 144,451, Oct. 27, 1993.

[51] Int. Cl.⁶ .............................. H03K 17/08; H03K 3/72
[52] U.S. Cl. ................................. 364/557; 364/707
[58] Field of Search .................. 364/557, 556, 364/550, 578, 707; 361/688, 722, 103; 374/143, 183; 257/712; 395/750

[56] References Cited

U.S. PATENT DOCUMENTS

| | | | |
|---|---|---|---|
| 3,860,861 | 1/1975 | Gucker | 318/473 |
| 4,044,288 | 8/1977 | Godfrey | 318/485 |
| 4,137,563 | 1/1979 | Tsunoda | 364/200 |
| 4,291,355 | 9/1981 | Dinger | 361/31 |
| 4,307,325 | 12/1981 | Saar | 388/809 |
| 4,319,298 | 3/1982 | Davis et al. | 361/24 |
| 4,413,213 | 11/1983 | Baumgarten, Jr. | 388/814 |
| 4,413,325 | 11/1983 | Elfner et al. | 364/557 |
| 4,733,974 | 3/1988 | Hagerman | 364/557 X |
| 4,743,818 | 5/1988 | Quayle et al. | 361/24 X |
| 5,189,314 | 2/1993 | Georgiou et al. | 307/271 |
| 5,189,647 | 2/1993 | Suzuki et al. | 364/707 X |
| 5,225,992 | 7/1993 | Kobari et al. | 364/557 X |
| 5,230,055 | 7/1993 | Katz et al. | 364/557 X |
| 5,287,292 | 2/1994 | Kenny et al. | 364/557 |
| 5,311,448 | 5/1994 | Waggoner et al. | 364/578 |
| 5,383,137 | 1/1995 | Burch | 364/578 |
| 5,452,401 | 9/1995 | Lin | 395/750 |

FOREIGN PATENT DOCUMENTS

| | | | |
|---|---|---|---|
| 9208268 | 5/1992 | European Pat. Off. | 364/557 |
| WO92/10032 | 6/1992 | WIPO. | |

*Primary Examiner*—Ellis B. Ramirez
*Assistant Examiner*—M. Kemper
*Attorney, Agent, or Firm*—Volel Emile; John G. Graham; Andrew J. Dillon

[57] ABSTRACT

An apparatus for managing operations of a circuit, including apparatus for computing a cumulative thermal load caused by instructions to be executed by the circuit, apparatus for determining whether the cumulative thermal load exceeds a thermal range of the circuit, and apparatus, coupled to the apparatus for determining, for reducing the cumulative thermal load of the circuit prior to execution of the instructions determined to cause the thermal range to be exceeded. In addition, a method for managing operations of a circuit, including the steps of computing a cumulative thermal load caused by instructions to be executed by the circuit, determining whether the cumulative thermal load exceeds a thermal range of the circuit, and reducing, subsequent to the step of determining, the cumulative thermal load of the circuit prior to execution of the instructions determined to cause the thermal range to be exceeded.

30 Claims, 4 Drawing Sheets

METHOD AND APPARATUS FOR A THERMAL PROTECTION UNIT

This is a continuation of application Ser. No. 08/144,451, filed 27 Oct. 1993.

TECHNICAL FIELD

This invention relates generally to electronic circuits and more particularly to a thermal protection unit for electronic circuits.

BACKGROUND OF THE INVENTION

The problem of circuits overheating is well known in the art. Typically, the circuits are tested to determine the maximum thermal conditions that the circuits can withstand and then appropriate cooling is provided, such as a fan, to prevent such a condition from occurring.

Computer circuitry is particularly susceptible to overheating and the computer may be occasionally used in conditions outside specified normal ranges. For example, ambient temperatures may exceed the specifications for the computer such as when air conditioning is temporarily out of order or collected dust and other contaminants may prevent the cooling fans from working properly. As a result, some form of heat detection such as a thermistor may be coupled to a fan to prevent the computer circuits from overheating by increasing the fan speed when the thermistor detects that the computer may be overheating. However, thermistors and many other types of analog sensors are subject to inaccuracies from unit variation and from degradation over time. As a result, some overheating conditions may not be detected by a thermistor.

DISCLOSURE OF THE INVENTION

The present invention includes an apparatus for managing operations of a circuit, including apparatus for computing a cumulative thermal load caused by instructions to be executed by the circuit, apparatus for determining whether the cumulative thermal load exceeds a thermal range of the circuit, and apparatus, coupled to the apparatus for determining, for reducing the cumulative thermal load of the circuit prior to execution of the instructions determined to cause the thermal range to be exceeded. In addition, the present invention includes an apparatus for managing operations of a circuit, including apparatus for computing a cumulative thermal load by accumulating predetermined thermal load values for the circuit when receiving a signal from the circuit, apparatus for determining whether the cumulative thermal load exceeds a thermal range of the circuit, and apparatus, coupled to the apparatus for determining, for reducing the cumulative thermal load of the circuit when the thermal load is determined to exceed the thermal range of the circuit. Furthermore, the present invention includes a method for managing operations of a circuit, including the steps of computing a cumulative thermal load caused by instructions to be executed by the circuit, determining whether the cumulative thermal load exceeds a thermal range of the circuit, and reducing, subsequent to the step of determining, the cumulative thermal load of the circuit prior to execution of the instructions determined to cause the thermal range to be exceeded. In addition, the present invention includes a method for managing operations of a circuit, including the steps of computing a cumulative thermal load by accumulating predetermined thermal load values for the circuit when receiving a signal from the circuit, determining whether the cumulative thermal load exceeds a thermal range of the circuit, and reducing, subsequent to the step of determining, the cumulative thermal load of the circuit when the thermal load is determined to exceed the thermal range of the circuit.

A further understanding of the nature and advantages of the present invention may be realized by reference to the remaining portions of the specification and the drawings.

BEST MODE FOR CARRYING OUT THE INVENTION

This disclosure describes a thermal protection circuit that models the thermal characteristics of a circuit and then acts to prevent the circuit from overheating. The thermal protection circuit is particularly applicable to circuitry that is used sporadically rather than constantly. That is, circuitry that is used sporadically and may need minimal cooling under normal conditions, but may overheat in a few unusual situations where the circuitry is used continuously or nearly continuously. The circuitry could be packaged or cooled sufficiently to allow for all such conditions, but such an approach may be unnecessarily expensive. As a result, the present invention allows the use of less expensive packaging with less effective cooling capabilities or the use of the same packaging with more powerful or faster circuitry.

Figure 1:
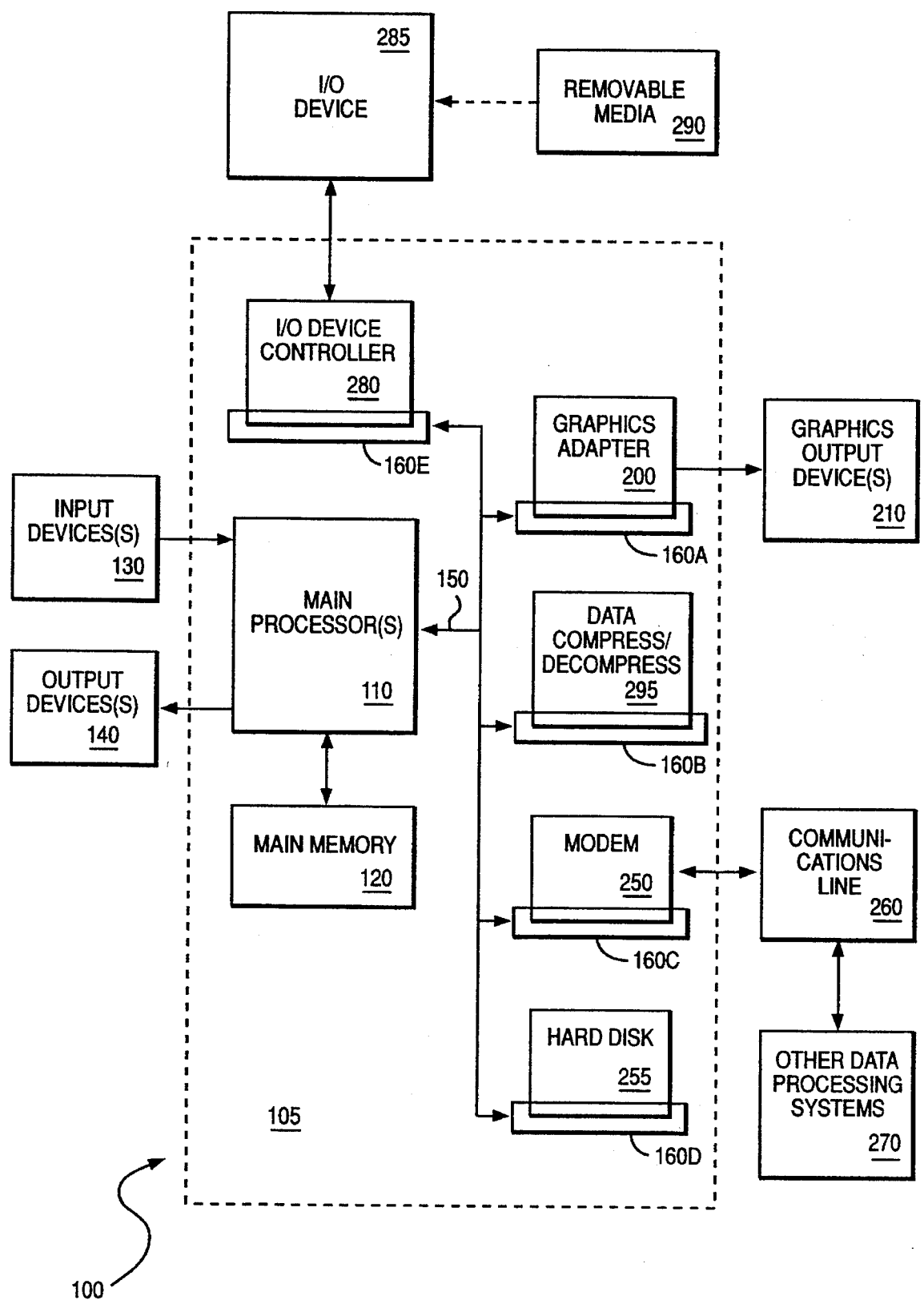
FIG. 1 is a block diagram of a typical digital computer utilized by a preferred embodiment of the invention.

FIG. 1 is a block diagram of a typical digital computer 100 utilized by a preferred embodiment of the invention. The computer includes main processor(s) 110 coupled to a main memory 120 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 210 such as a graphics display through a graphics adapter 200. Graphics adapter 200 may be located in an adapter slot 160A. Graphics adapter 200 receives instructions regarding graphics from main processor 110 on bus 150, thereby rendering the desired graphics output from the main processor. A modem or other communications adapter 250 and a hard disk 255 may also be located in slots 160C and 160D to provide communications with main processor 110 across bus 150. Modem 250 may communicate with other data processing systems 270 across communications line 260. Computer readable removable media 290, such as a magnetic diskette or a compact disc, may be inserted into an input/output device 285, such as a disk drive or a CD-ROM (compact disc—read only memory) driver. Data is read from or written to the removable media by the I/O device under the control of the I/O device controller 280.

The I/O device controller communicates with the main processor through slot 160E across bus 150. Main memory 120, hard disk 255 and removable media 290 are all referred to as memory for storing data for processing by processor 110.

Data compress/decompress adapter 295 is a device for compressing or decompressing data and may be located in slot 160B. The adapter may be located in many other locations including in hard disk 255 or directly coupled to main processor 110. In the present example, data may be sent from main memory 120 across bus 150 to data compress/decompress adapter 295 for compression. The data compress/decompress adapter 295 may then send the compressed data across bus 150 to hard disk 255 for storage. As a result, the effective storage capacity of the hard disk is increased substantially. When required again for use by main processor 110, the compressed data is transferred from hard disk 255 to data compress/decompress adapter 295 across bus 150 for decompression. The compress/decompress adapter 295 may then send the decompressed data across bus 150 to the main processor 110 for its use. Data may also be compressed prior to storing on removable media 290, thereby increasing the storage capacity of the removable media. Furthermore, data may be compressed prior to sending the data to other data processing systems through modem 250 across communications line 260, thereby increasing the effective speed of communications. Other uses of compressed data are well known in the art.

Figure 2:
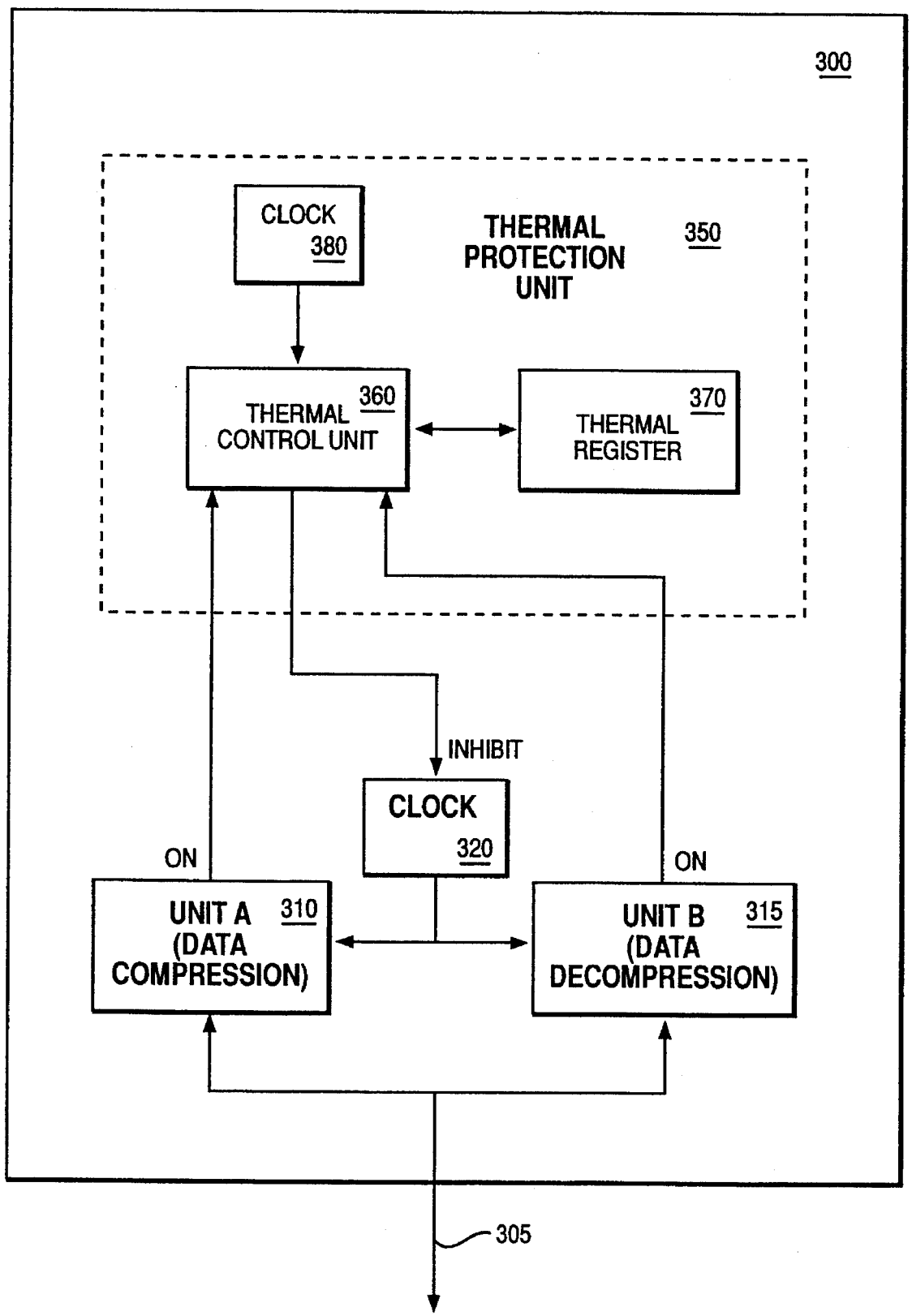
FIG. 2 is a block diagram of a data compress/decompress adapter according to a preferred embodiment of the invention.

FIG. 2 is a block diagram of a data compress/decompress adapter 300 according to a preferred embodiment of the invention. If data is to be compressed, then it is received by unit A 310 across bus 305. However, if the data is to be decompressed, then it is received by unit B 315 across bus 305. Units A & B may utilize one of many types of data compression or decompression, many of which are known in the art. For example, the data compression and decompression devices may be those described in commonly assigned patent application Ser. No. 07/807,007, entitled "METHOD AND APPARATUS FOR COMPRESSING DATA", filed Dec. 13, 1991, hereby incorporated by reference. The operations of units A & B are clocked by clock 320. That is, the speed of clock 320 determines the speed of the data compression or the data decompression.

Data compression and data decompression may require many rapid searches of previous data compressed or decompressed by the data compression or decompression units. As a result, data compression and decompression devices may typically use large quantities of power, thereby generating much heat that must be dissipated. However, data compression and decompression units typically work sporadically upon demand and typically do not run continuously. As a result, inexpensive cooling and/or packaging for such units, typically adequate for normal operations, may not be sufficient for continuous use. If a data compression/decompression adapter were run continuously, the unit may overheat and be damaged. As a result, the preferred embodiment of the invention has a thermal protection unit 350 for protecting the data compression/decompression circuitry from such an occurrence. The thermal protection unit models the thermal characteristics of the circuit, predicts from the usage pattern when a thermal overload is imminent, and takes corrective action. A thermal overload occurs when the circuit is about to overheat due to a net thermal energy gain such that the circuit is about to exceed a desired temperature. The thermal protection units includes a thermal control unit 360 coupled to a thermal register 370 and a clock 380. In the preferred embodiment, the thermal control unit receives an ACTIVE signal from unit A and unit B whenever those devices are processing data. Once the thermal control unit determines that the circuit may be over heating due to unusual continuous operation of units A and B, then the thermal control unit inhibits the clock 320. Inhibiting clock 320 slows or stops units A and B from processing data, thereby allowing the overall circuit to cool down and preventing overheating. Operation of the thermal protection unit is described in greater detail in FIG. 3.

Figure 3:
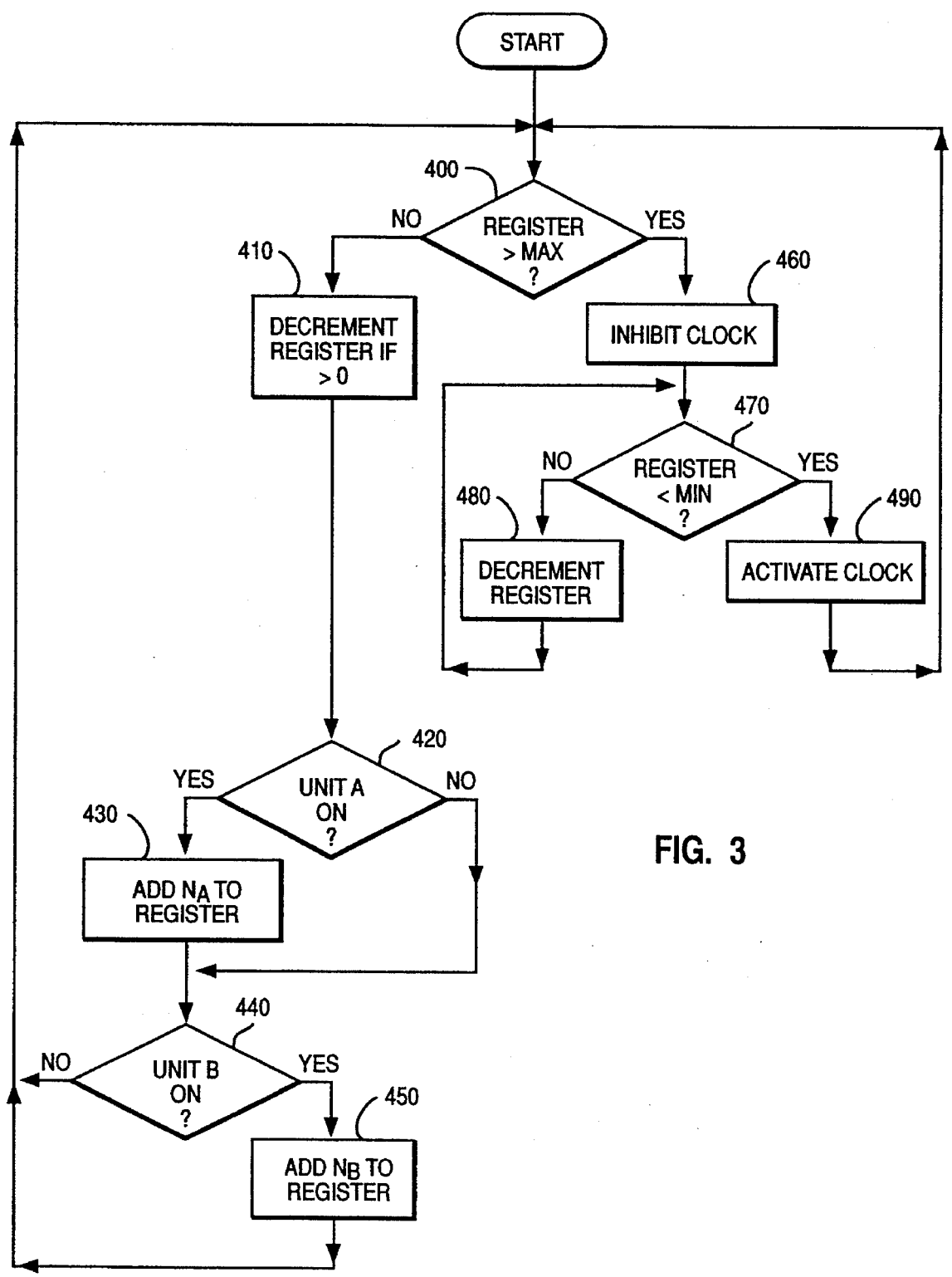
FIG. 3 is a flowchart illustrating operation of the thermal protection unit described in FIG. 2.

FIG. 3 is a flowchart illustrating operation of the thermal protection unit described in FIG. 2. In a first step 400 it is determined whether the thermal register has a value greater than a maximum value. If not, then in step 410 the register is decremented if the value of the register is greater than 0 in step 410. Once the register is decremented, the thermal control unit determines whether unit A is on in step 420. If unit A is on, then in step 430 a predetermined value $N_A$ is added to the thermal register 370. The value of $N_A$ is predetermined as the number of time periods needed to dissipate heat generated by unit A for each time period unit A operates. Processing then continues to step 440 to determine whether unit B is on. If unit B is on, then in step 450 a predetermined value $N_B$ is added to the thermal register. The value of $N_B$ is predetermined as the number of time periods needed to dissipate heat generated by unit B for each time period unit B operates. Processing then returns to step 400. Steps 400 through 450 are preferably performed in a predetermined amount of time, preferably a predetermined number of clock cycles.

If units A and B are operating continuously or nearly continuously, then the thermal register value may exceed the maximum value in step 400. Once that condition occurs, then processing continues to 460. In step 460, clock 320 is inhibited. In the preferred embodiment, clock 320 is inhibited by turning the clock off thereby stopping operations of units A and B. In an alternative embodiment, the clock 320 may merely be slowed to a value or a speed that allows units A and B to continue operating but at a speed that does not overheat the circuit. Please note that when clock 320 is inhibited, clock 380 continuous to operate at a predetermined speed such that the thermal protection unit can continue monitoring the thermal characteristics of the circuit. Once the clock is inhibited, processing continues to step 470. In step 470 it is determined whether the value of the thermal register is less than a minimum value. If the register value is still greater than or equal to the minimum value then the thermal register is decremented in step 480. The amount of decrementing may be varied based on the speed of clock 320 if units A and B continue operating at a lower speed. Processing then returns to step 470. If it is determined in step 470 that the register value is less than the minimum value, then processing continues to step 490. In step 490, clock 320 is reactivated or sped up to the original speed. As result, units A and B may then continue operating normally until another potential overheating situation occurs.

For illustrative purposes, an example with values is described below with reference to FIG. 3. The circuit described above may be a semiconductor chip on a module in an environment capable of cooling 100 mW (milliwatts) of power. Unit A dissipates 2300 mW when it is compressing data and unit B dissipates 500 mW power when it is decompressing data. In this case, the thermal register should decrement by 1 (for 100 mW) for each clock cycle and the register should increment by 23 (for 2300 mW) for each clock cycle that unit A is active compressing data and the register should increment by 5 (for 500 mW) for each clock cycle unit B is active decompressing data. Of course, each incremental value may be rounded up to the next largest binary value for providing a margin and for simplification of circuitry. In addition, the amount of decrementing may be a value other than 1 depending upon the relative cooling capability of the system. Furthermore, the decrement amount may also be decreased if some subsystems of the chip dissipate a constant amount of heat. For example, if the environment is capable of cooling 300 mW and other subsystems generate a constant 100 mW of heat per time period for a net cooling of 200 mW, then the register should be decremented by 2 each clock cycle in the present example.

It may be determined that the chip normally operates at 75 degrees centigrade with 100 mW dissipation. It may also be determined that the chip should not exceed 80 degrees centigrade and that it takes 65,536 clock cycles to cool the chip 5 degrees centigrade when neither unit A nor unit B is operating. As a result, the thermal register should have a maximum value of 65,536 (however, a margin may also be provided by reducing the number of clock cycles in the maximum value). A sixteen bit counter may be used for the thermal register in this case. If for some reason unit A operates continuously, then the thermal register will reach the maximum value in 65,536/(23-1) or 2,979 clock cycles. If for some reason unit B operates continuously, then the thermal register will reach the maximum value in 65,536/(5-1) or 16,384 clock cycles. If for some reason units A and B both operate continuously, then the thermal register will reach the maximum value in 65,536/(23+5-1) or 2,428 clock cycles.

Figure 4:
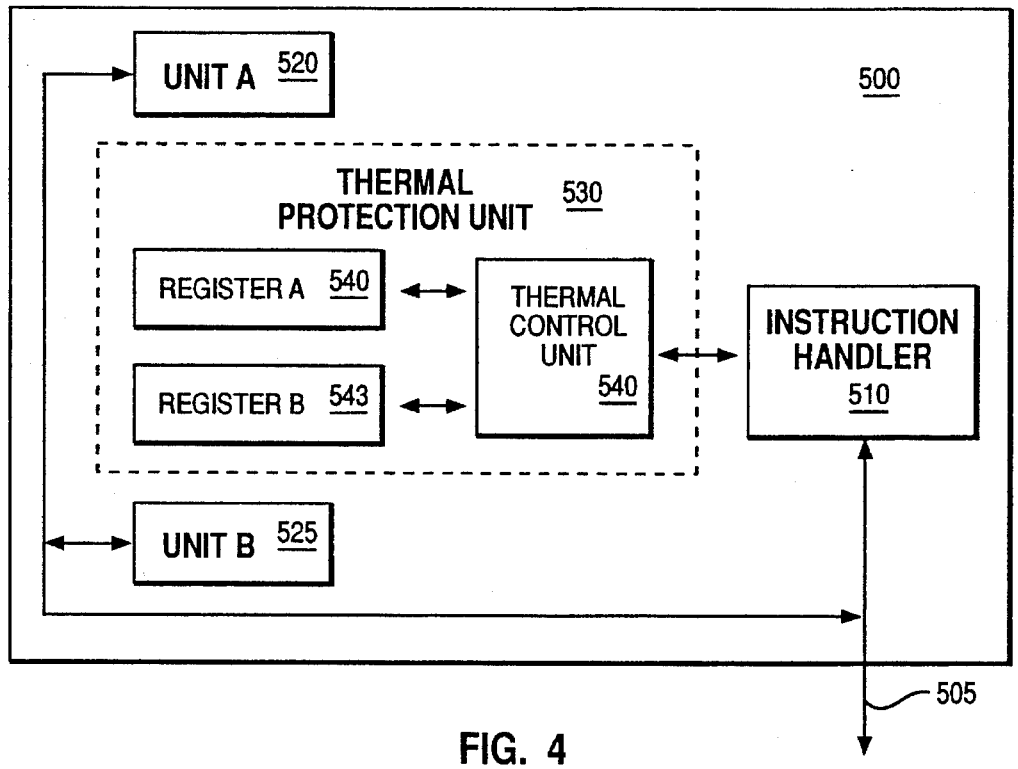
FIG. 4 is a block diagram of an alternative embodiment of the invention.

FIG. 4 is a block diagram of an alternative embodiment of the invention. A circuit 500 which may be an adapter such as data compression/decompression adapter or may be a main processing unit or one of may other types of circuits located within data processing systems. The circuit 500 receives instructions across a bus 505 into instruction handler 510. The instruction handler then passes the instructions onto unit A 520 or unit B 525. Of course, additional processing units may be utilized including pipelined units, parallel units, or any combination thereof, while utilizing the concepts of the present invention. After unit A and unit B process the instructions the results of the processes are passed onto bus 505.

Circuit 500 includes a thermal protection unit 530 for preventing the circuit from overheating. The thermal protection unit includes a thermal control unit 540 coupled to instruction handler 510. The thermal protection unit also includes register A 541 and register B 543. Register A contains the current thermal load for unit A and register B contains the current thermal load for unit B. Separate thermal registers for units A and B are used because the units may be somewhat thermally separated such that one unit may overheat before the other unit does. In addition, each thermal register may partially impacted by both units. For example, the two units may be separate chips in a module. If unit A generates 500 mW of heat, the register A may be incremented by 4 and register B may be incremented by 1 to model the cross-unit thermal effects. If the units are thermally separated, then separate thermal protection units may be used for each unit. The operation of the thermal protection unit may be better understood with reference to FIG. 5.

Figure 5:
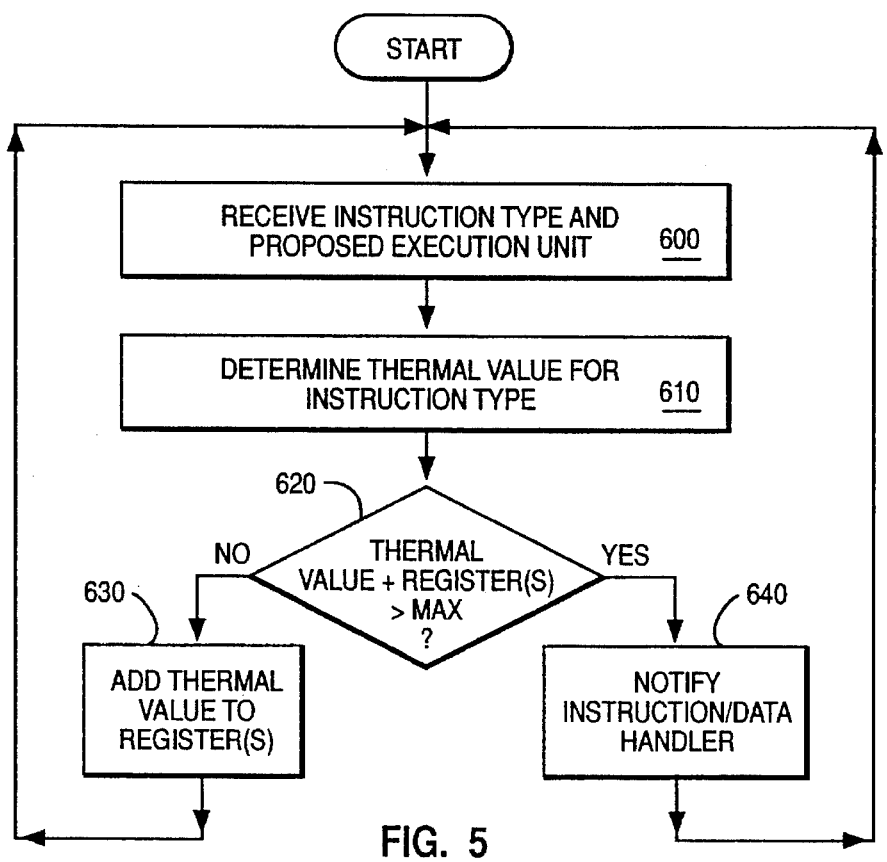
FIG. 5 is a flowchart illustrating operation of the thermal control unit described in FIG. 4.

FIG. 5 is a flowchart illustrating operation of the thermal control unit described in FIG. 4. In a first step 600, the thermal control unit receives from the instruction handler the type of instruction to be executed and which unit will be executing that instruction. In step 610, the thermal protection unit determines the thermal value for the instruction type for the executing unit. In step 620, the thermal control unit determines whether the thermal value for the instruction type plus the value of the register for the executing unit is greater than the predetermined maximum value. In addition, the thermal control unit also determines whether the thermal load for the other unit is greater than the maximum value for that unit. If not, then in step 630 the thermal control unit adds the appropriate thermal value for the instruction type to the appropriate registers. If the thermal value does exceed the predetermined maximum values, then in step 640 the thermal control units notifies the instruction handler that the instruction type cannot be executed by the proposed execution unit at the current time. The instruction handler then waits some period of time and retries the instruction type again at a later time. In an alternative environment the instruction handler may pass the instruction to a different execution unit for execution by again querying the thermal protection unit as to whether the new proposed unit can execute the instruction. In another alternative embodiment, a clock for a hot execution unit may be slowed down or inhibited for some period of time. In addition to the above, the thermal control unit is continually decrementing all the registers over time according to the thermal characteristics of the circuit package and its cooling.

In another alternative embodiment, the thermal protection circuitry may increase cooling of the circuit being protected rather than reducing the power consumption of the circuit. For example, a fan used for cooling the circuit may be sped up to increase air flow across the circuit, thereby allowing the circuit to continue operations. This increases cooling may be modeled by the thermal protection unit by increasing the amount the thermal register is decremented each clock cycle. In addition, multiple maximum and minimum values may be used for each fan speed.

An advantage of the embodiments described above is that no analog sensors are needed to prevent the circuitry from overheating. That is, the thermal characteristics of the circuitry are modeled by using digital signals indicating operations or future operations of the circuitry, and predetermined values are used to model the thermal characteristics of those operations. As a result, the described embodiments are not subject to the inaccuracies and complexities of analog circuits, and can be integrated into the digital circuitry and manufactured using the same process.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for managing operations of a circuit which executes a sequence of digital instructions, comprising:

means responsive to said sequence of digital instructions to be executed by said circuit for computing predicted cumulative power dissipation to be caused by said sequence of digital instructions by accumulating predetermined thermal load values for said sequence of instructions to be executed;

means for determining whether said cumulative power dissipation exceeds a permissible range of said circuit, and if so, to produce an overload indication; and means, responsive to said overload indication from said means for determining, for reducing the cumulative power dissipation of said circuit prior to execution of said sequence of instructions.

2. The apparatus of claim 1 wherein said means for reducing includes delaying execution of said sequence of instructions.

3. The apparatus of claim 1 wherein said means for reducing includes reducing a clock speed of said circuit.

4. The apparatus of claim 1 wherein said means for reducing includes increasing cooling of said circuit.

5. The apparatus of claim 1 wherein the means for reducing includes causing a second circuit to execute said sequence of instructions.

6. An apparatus for managing operations of a circuit which executes a sequence of digital instructions, comprising:

means responsive to said sequence of digital instructions to be executed by said circuit for computing a predicted cumulative power dissipation to be caused by said sequence of digital instructions by accumulating predetermined thermal load values for said sequence of instructions to be executed;

means for determining whether said cumulative power dissipation exceeds a permissible range of said circuit, and if so, to produce an overload indication; and means, responsive to said overload indication from said means for determining, for reducing the cumulative power dissipation of said circuit when said power dissipation is determined to exceed the permissible range of the circuit prior to execution of the sequence of instructions to be executed.

7. The apparatus of claim 6 wherein said means for reducing includes inhibiting a clock of said circuit.

8. The apparatus of claim 7 wherein said means for reducing includes reducing a clock speed of said circuit.

9. The apparatus of claim 6 wherein said means for reducing includes increasing cooling of said circuit.

10. The apparatus of claim 6 wherein the means for reducing includes causing a second circuit to execute said sequence of instructions.

11. A method for managing operations of a circuit which executes a sequence of digital instructions, comprising the steps of:

computing, in response to said sequence of digital instructions to be executed by said circuit, a predicted cumulative power dissipation to be caused by said sequence of digital instructions by accumulating predetermined values for each instruction of said sequence of instructions to be executed;

determining whether said cumulative power dissipation exceeds a permissible range of said circuit, and if so, producing an overload indication; and in response to said overload indication, reducing, subsequent to said step of determining, the cumulative power dissipation of said circuit prior to execution of said sequence of instructions.

12. The method of claim 11 wherein said step of reducing includes delaying execution of said sequence of instructions.

13. The method of claim 11 wherein said step of reducing includes reducing a clock speed of said circuit.

14. The method of claim 11 wherein said step of reducing includes increasing cooling of said circuit.

15. The method of claim 11 wherein the step of reducing includes causing a second circuit to execute said sequence of instructions.

16. A method for managing operations of a circuit which executes a sequence of digital instructions, comprising the steps of:

computing a predicted cumulative power dissipation to be caused by said sequence of digital instructions by accumulating predetermined thermal load values for each instruction of said sequence of instructions to be executed;

determining whether said cumulative power dissipation exceeds a permissible range of said circuit, and if so, producing an overload indication; and in response to said overload indication, reducing, subsequent to said step of determining, the cumulative power dissipation of said circuit when said power dissipation is determined to exceed said permissible range, prior to execution of the sequence of instructions to be executed.

17. The method of claim 16 wherein said step of reducing includes inhibiting a clock of said circuit.

18. The method of claim 17 wherein said step of reducing includes reducing a clock speed of said circuit.

19. The method of claim 16 wherein said step of reducing includes increasing cooling of said circuit.

20. The method of claim 16 wherein the step of reducing includes causing a second circuit to execute said sequence of instructions.

21. A data processing system comprising:

processing means for processing data, said processing means executing a sequence of digital instructions;

storage means for storing data to be processed by said processing means; and means for managing operations of said processing means including i) means responsive to said sequence of digital instructions to be executed by said circuit for computing predicted cumulative power dissipation to be caused by said sequence of digital instructions by accumulating predetermined thermal lead values for said sequence of instructions to be executed;

ii) means for determining whether said cumulative power dissipation exceeds a permissible range of said circuit, and if so, to produce an overload indication; and iii) means, responsive to said overload indication from said means for determining, for reducing the cumulative power dissipation of said circuit prior to execution of said sequence of instructions.

22. The data processing system of claim 21 wherein said means for reducing includes delaying execution of said sequence of instructions.

23. The data processing system of claim 21 wherein said means for reducing includes reducing a clock speed of said processing means.

24. The data processing system of claim 21 wherein said means for reducing includes increasing cooling of said processing means.

25. The data processing system of claim 21 wherein the means for reducing includes causing a second circuit to execute said sequence of instructions.

26. A data processing system comprising:

processing means for processing data; said processing means executing a sequence of instructions for processing said data;

storage means for storing data to be processed by said processing means; and means for managing operations of said processing means, comprising:

i) means responsive to said sequence of digital instructions to be executed by said circuit for computing a predicted cumulative power dissipation to be caused by said sequence of digital instructions by accumulating predetermined thermal lead values for said sequence of instructions to be executed;

ii) means for determining whether said cumulative power dissipation exceeds a permissible range of said circuit, and if so, to produce an overload indication; and iii) means, responsive to said overload indication from said means for determining, for reducing the cumulative power dissipation of said circuit when said power dissipation is determined to exceed the permissible range of the circuit prior to execution of the sequence of instructions to be executed.

27. The data processing system of claim 26 wherein said means for reducing includes inhibiting a clock of said processing means.

28. The data processing system of claim 27 wherein said means for reducing includes reducing a clock speed of said processing means.

29. The data processing system of claim 26 wherein said means for reducing includes increasing cooling of said processing means.

30. The data processing system of claim 26 wherein the means for reducing includes causing a second circuit to execute said sequence of instructions.

* * * * *